Figure 1:
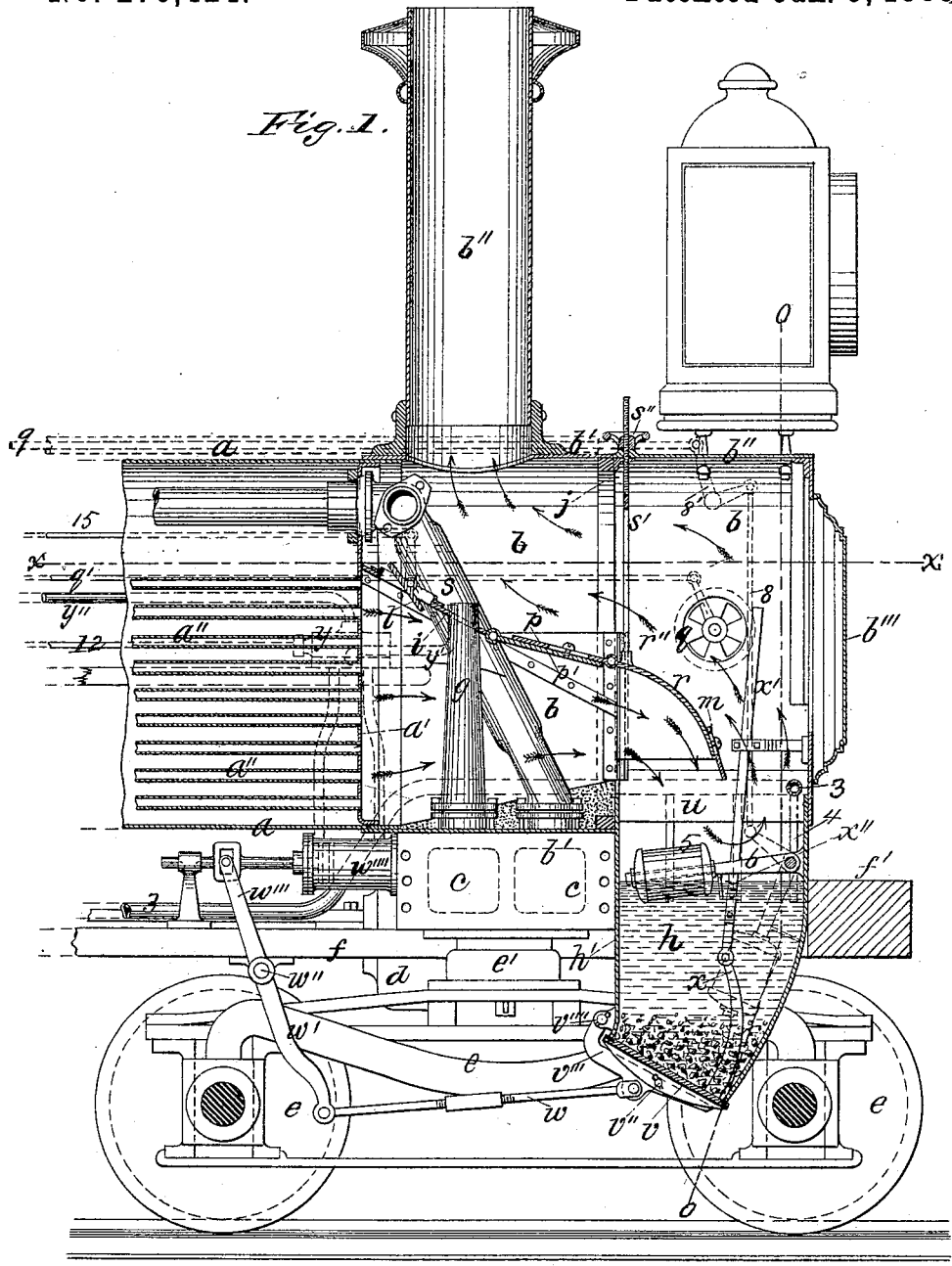

(No Model.) 6 Sheets—Sheet 1.

D. GROESBECK, J. A. STERLING, C. A. BALL, & D. P. WRIGHT.
SPARK ARRESTER.

No. 270,424. Patented Jan. 9, 1883.

Witnesses:
Henry F. Parker
Jno. E. Gavin

Inventors:
David Groesbeck
D. Pratt Wright
Joseph A. Sterling
Chas. A. Ball
By Chas. M. Higgins
Atty (No Model.) 6 Sheets—Sheet 2.
D. GROESBECK, J. A. STERLING, C. A. BALL, & D. P. WRIGHT.
SPARK ARRESTER.

No. 270,424. Patented Jan. 9, 1883.

Fig. 2.

Fig. 7.

Witnesses:
Henry F. Parker.
Jno. E. Savin.
Chas. M. Higgins
Attorney

Inventors:
David Groesbeck
D. Pratt Wright
Joseph A. Sterling
Chas. A. Ball (No Model.) 6 Sheets—Sheet 3.
D. GROESBECK, J. A. STERLING, C. A. BALL, & D. P. WRIGHT.
SPARK ARRESTER.

No. 270,424. Patented Jan. 9, 1883.

Witnesses:
Henry F. Parker
Jno. E. Gavin

Inventors:
David Groesbeck
D. Pratt Wright
Joseph A. Sterling
Chas. A. Ball
by Chas. M. Higgins
Attorney (No Model.) 6 Sheets—Sheet 4.
D. GROESBECK, J. A. STERLING, C. A. BALL,
& D. P. WRIGHT.
SPARK ARRESTER.
No. 270,424. Patented Jan. 9, 1883.
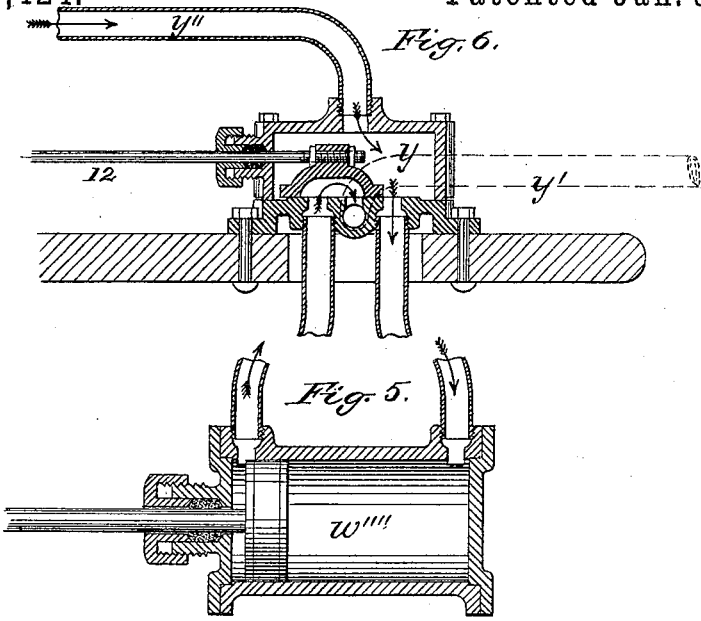
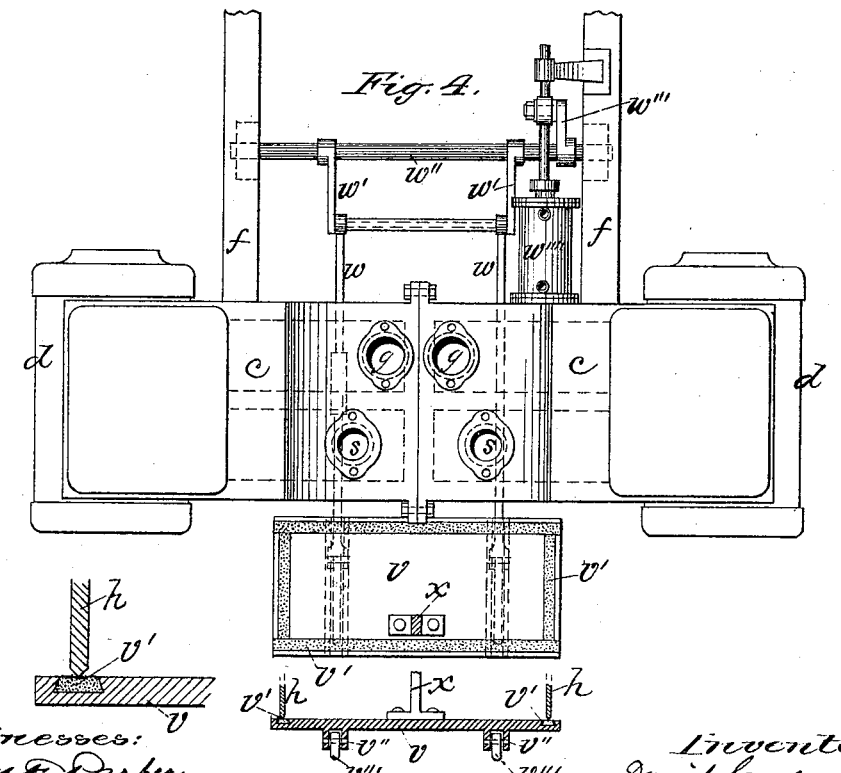

(No Model.) 6 Sheets—Sheet 5.
D. GROESBECK, J. A. STERLING, C. A. BALL, & D. P. WRIGHT.
SPARK ARRESTER.
No. 270,424. Patented Jan. 9, 1883.
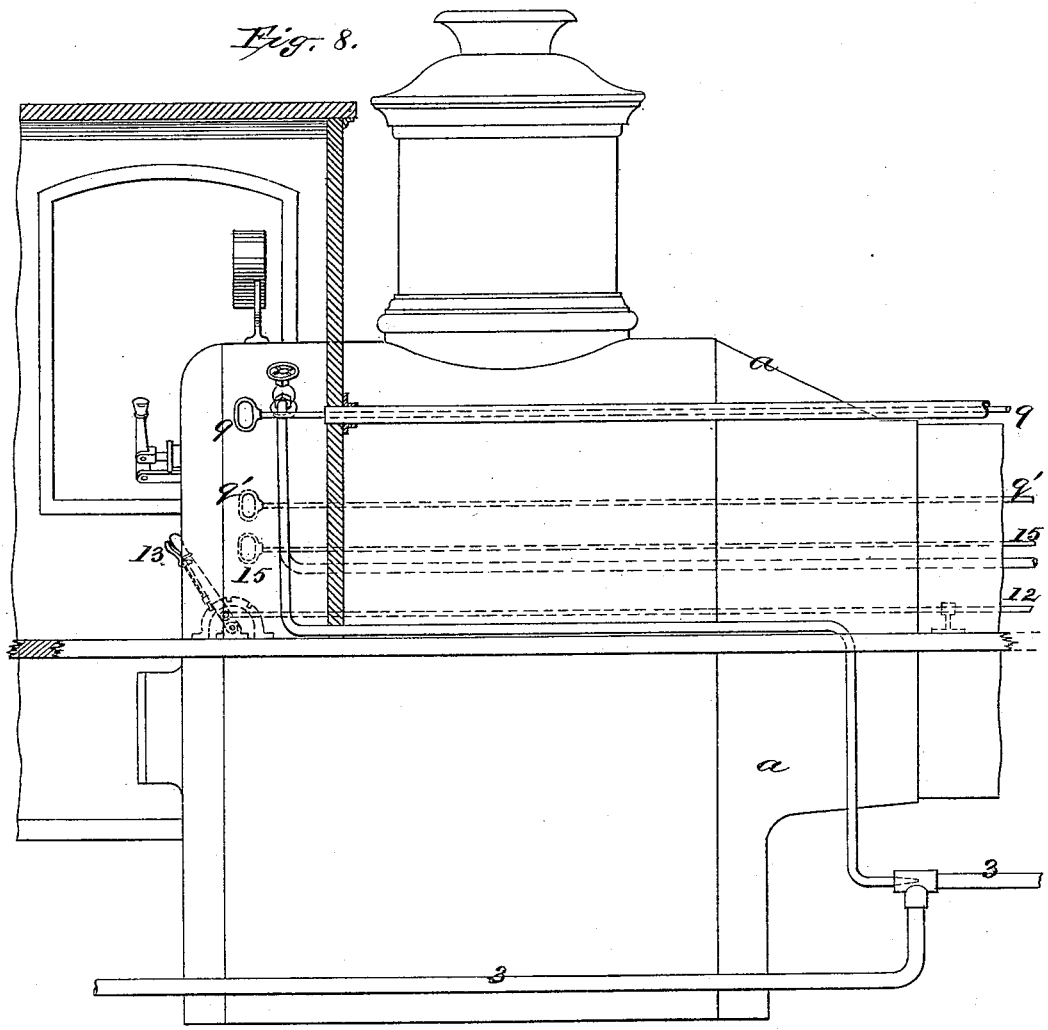

(No Model.) 6 Sheets—Sheet 6.
D. GROESBECK, J. A. STERLING, C. A. BALL, & D. P. WRIGHT.
SPARK ARRESTER.
No. 270,424. Patented Jan. 9, 1883.
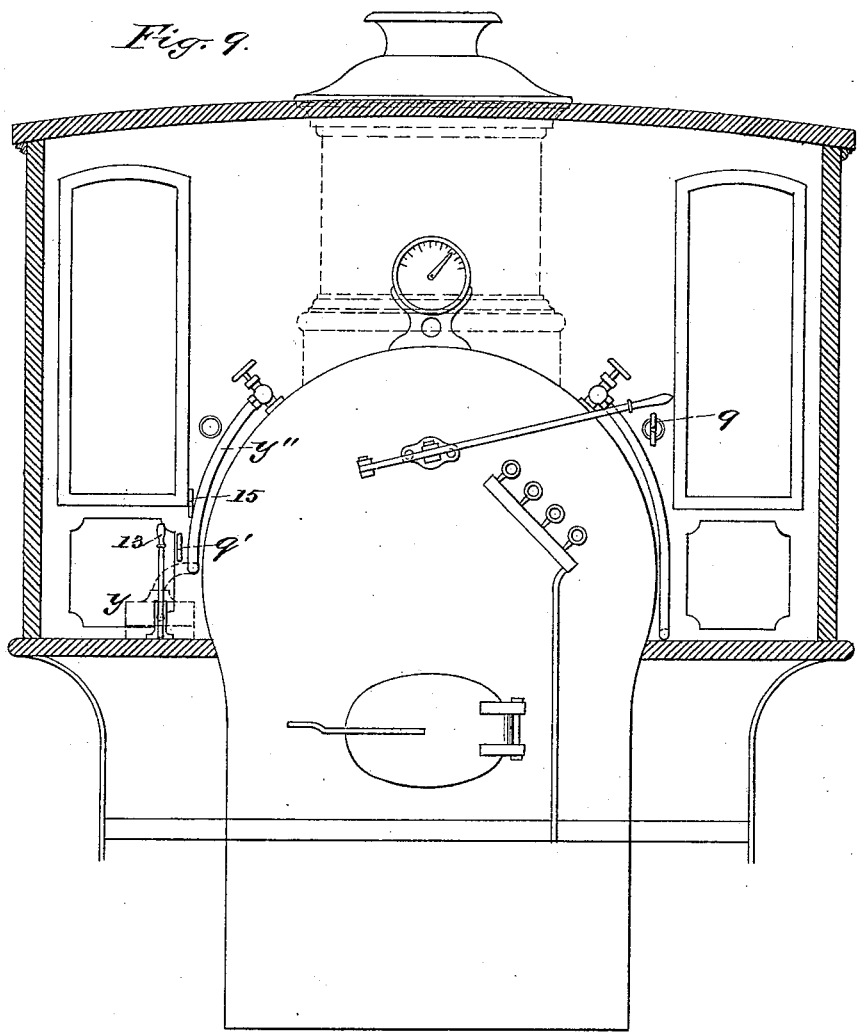

UNITED STATES PATENT OFFICE.

DAVID GROESBECK, JOSEPH A. STERLING, AND CHARLES A. BALL, OF NEW YORK, N. Y., AND D. PRATT WRIGHT, OF NORWOOD, MASSACHUSETTS, ASSIGNORS TO THE GROESBECK & WRIGHT SPARK ARRESTER COMPANY, OF NEW YORK, N. Y.

SPARK-ARRESTER.

SPECIFICATION forming part of Letters Patent No. 270,424, dated January 9, 1883.

Application filed October 7, 1882. (No model.)

*To all whom it may concern:*

Be it known that we, DAVID GROESBECK, JOSEPH A. STERLING, and CHARLES A. BALL, all of New York, N. Y., and D. PRATT WRIGHT, of Norwood, Massachusetts, have jointly invented certain new and useful Improvements in Spark-Arresters, of which the following is a specification.

Our invention relates to that class of spark-arresters, more especially for locomotive-engines, in which the smoke-arch is constructed with a downwardly-extending deflector or descending flue extending out from the tube-sheet over the boiler-tubes and opening over a mass of water held in the front and base of the smoke-arch, whereby the draft is directed downward upon the water, into which the sparks are projected, and thus extinguished, while the draft is thence deflected toward the stack. Spark-arresters of this class are shown in former patents issued respectively to the aforesaid D. Pratt Wright, June 1, 1880, No. 228,431, and to the aforesaid David Groesbeck, December 21, 1880, No. 235,762, and another instance is shown in a former application filed by the said Groesbeck, October 5, 1881; and our present joint invention is an important improvement on the said former inventions.

It is well known that many attempts have been heretofore made to produce an efficient spark-arrester, and previous to our inventions above named several instances could of course be given of the use of extinguishing masses of water over or into which the draft was directed. In the earlier instances of this plan the water seems to have been placed on the top of the smoke-arch and the draft led up to and over the same, which seems to have been an impracticable or objectionable arrangement. In later instances, however, the water has been placed in the base of the smoke-box and the draft directed downward over the same, and thence up to the stack. This latter arrangement seems, however, to have been applied to agricultural engines, in which the conditions of operation are considerably different from that existing in locomotive-engines; and we are not aware that this plan has ever been embodied previous to our inventions in a locomotive-engine in such a manner as to be adapted to the several conditions and requirements of locomotive work. In locomotives it is quite important that if the sparks be arrested the draft or steaming qualities of the engine be not reduced; that the spark-deflector should be capable of adjustment, so that the draft or suction of the exhaust-jet can be regulated to draw evenly on the different tubes of the boiler; that means be provided for easily renewing the water in the extinguishing-tank, and that the height of the water and the accumulated depth of the cinders be readily indicated to the engineer, that the contents of the extinguishing-tank may be readily dumped, when accumulated, by a manipulation from the cab, and the tank washed out and again tightly closed to receive a fresh charge of water. Means for preventing the overflow of the water or its rise into the hot boiler-tubes are also necessary, and, what is very important, the splashing and ejection of this water by the rocking motion of the engine and by the powerful eductive action of the exhaust-jet must be positively prevented.

Now, profiting by the experience with our former inventions, and by continued experimental applications to locomotives in practical action, we have by our joint efforts learned the importance of the above requirements, and have thus developed our present invention, which consists in means to fulfill the several requirements aforesaid, and to this end embodies a number of novel features, as hereinafter fully set forth.

Figure 3:
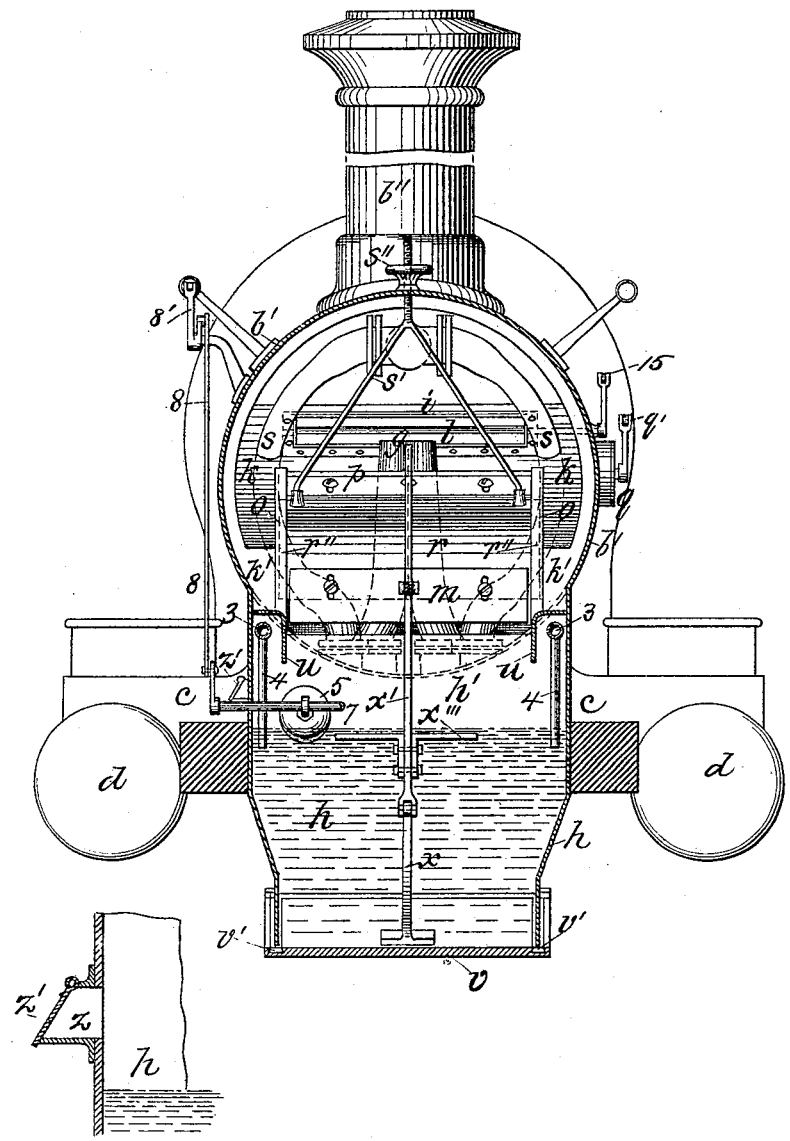

In the drawings annexed, Figure 1 presents a central vertical section through the front end of a locomotive-engine provided with the several features of our improved spark-arrester. Fig. 2 is a sectional plan thereof on line *x x* of Fig. 1, and Fig. 3 is a transverse section on line *o o*. Fig. 4 is a plan view of the "saddle" portion of the engine, with the boiler, &c., removed, showing the mechanism for operating the dumping-door of the water-tank. The remaining figures illustrate details.

In the drawings, *a a* indicate the shell of the boiler, and *b'* the smoke-arch, affixed to the front end of the boiler, as usual, and resting on the saddle c c.

d d indicate the cylinders of the engine, which project from each end of the saddle, while the center of the saddle rests on the swivel e' of the four-wheeled truck e, which supports the front end of the engine.

f indicates the solid wrought-iron frame-bars of the engine, and f' the bumper-beam, all of which parts are presumed to be of the ordinary construction.

a' indicates the flue-sheet of the boiler, and a'' the tubes or flues, which discharge, as usual, into the smoke-arch b.

g indicates the exhaust-nozzles, which rise, as usual, from the exhaust-ports in the saddle through the bottom of the smoke-arch, and discharge under the center of the stack b'', as best shown in Figs. 1 and 3.

The smoke-arch b b', which usually ends at the ring j, (see Fig. 1,) we extend forward by an addition or extension shell, b'', which projects over the bumper-beam, and the movable door or head b''' of the smoke-arch is of course affixed on the front end of this extension, as shown in Fig. 1, which extension thus nearly doubles the internal capacity of the smoke-arch. In the base of this extension b'' is formed an extinguishing-chamber or water-tank, h, adapted to contain a large mass of water—say one hundred gallons—in which the sparks may be caught and extinguished. This tank projects down behind the bumper-beam and between the forward wheels of the truck, its front wall being curved or inclined backward to avoid the forward axle of the truck, as fully shown in Fig. 1, while the rear wall is preferably straight. Now, the interior of the smoke-arch is divided diagonally by an inclined downward-turned spark-deflecting partition or apron, i p r, similar to what is shown in the former Groesbeck application, which extends out from the flue-sheet above the flues, and terminates or discharges over and into the middle of the water-tank or chamber h, as well shown in Fig. 1. The lower diagonal half of the smoke-arch, below the deflector, thus forms a forward-descending flue discharging into the water-tank, as indicated by the arrows, while the upper diagonal half, above the deflector, forms an ascending and returning flue leading to the stack, and forming a free passage for the clear products of combustion from which the sparks or cinders have been separated by their projection into and extinguishment by the water, as will be understood.

The upper and inclined part of the deflector is fixed and flat, while the outer and downwardly-turned end is of a curved form, similar to the segment of a cylinder, and is movable or adjustable, as will hereinafter appear. The upper inclined and fixed part of the deflector consists of three plates, i k k, suitably bolted to angle-irons on the tube-sheet and on the sides of the smoke-arch, and secured to each other at their overlapping edges, as will be understood from Figs. 1, 2, and 3, so as to properly surround the steam-pipes s s and form a tight partition across that portion of the smoke-arch. Through the plate i is formed a large oblong opening, in which is fitted a damper, l, as shown in Figs. 1, 2, and 3, similar to that shown in the aforesaid Groesbeck application, and through this same plate the exhaust-nozzles g g project just in front of the damper, and terminate a little above the top of the plate i and in line with the center of the stack b'', which rises from the top of the smoke-arch directly over the same, as seen best in Fig. 1. The steam-pipes s s pass through the side plates, k, which extend along the sides of the smoke-arch from the tube-sheet a' to the ring j, and from the end of the side plates, k, small end plates, k', extend down vertically to the base of the smoke-arch, while triangular wings or plates o o rise vertically from the edges of the side plates, k k, and extend backward on a diminishing taper as far as the edge of the plate i, thus forming a contracted throat between said wings o and end plates, k', in which the movable or adjustable portion of the deflector works, and through which the draft issues, as seen best in Figs. 3 and 1. Now, on each side of the curved or downwardly-turned part r of the deflector, which may be termed the "hood," angle-irons r' are fixed, and engage with vertical guides r'', affixed at the edge of the wings o, and end plates, k', as well shown in Figs. 2, 3, and 1, thus forming ways which hold the hood in firm, regular position, and permit of its sliding up or down to any desired adjustment, as will be understood. Now, the hood is hinged at its upper edge to a large flat plate, p, which closely fits the space between the wings o, (see Figs. 1 and 2,) and closely overlies a similar plate, p', which is hinged to the front edge of the fixed plate i, and these two overlying plates are connected by headed screws which bear upon and pass through slots in the upper plate and screw into the under plate, as best shown in Figs. 1 and 2. It will therefore be seen that this hinged and oversliding connection of the plates p p' with each other and with the plate i and hood r permits the necessary movement or articulation of the plates as the hood is adjusted up or down, without allowing any leakage of draft through the spaces covered by said plates. Now, in order to permit the hood to be adjusted as required from the exterior of the engine, a forked rod, s', is connected with the hood, as seen best in Figs. 3 and 1, which rod is threaded at its upper part and rises through the sheet at the top of the smoke-arch, and engages with a hand-nut, s'', which bears upon the top of the smoke-arch just in front of the stack, as seen best in Fig. 1, so that by turning this nut or hand-wheel one way or the other the hood will be raised or lowered to any desired adjustment within the smoke-box. This adjustment is required in order to regulate the draft in the flues according to the individual peculiarities of each engine, for if the mouth of the deflector should open too far down it would cause the draft to become too strong through the lower tubes, and vice versa, so that by providing the described adjustment a medium position may be found in which the draft will be uniform on all the tubes, or nearly so, thus producing a more regular fire, a better distribution of the heat in the flues, and a more even and regular stream of draft through the smoke-box.

The rear wall, $h'$, of the water-box $h$ rises some little distance above the shell of the smoke-arch, as seen in Fig. 1, and the guides for the hood $r$ end at the top of said wall, which is the lowest position to which the hood may be set. Now, from this point the base of the smoke-box is filled with brick, cement, or other material, so as to form an inclined floor descending toward the flue-sheet at about an opposite inclination to that of the top of the deflector, as best shown in Fig. 1. The inclosed space in the smoke-box below the deflector thus converges both at top and bottom toward the mouth of the hood, and it is also made to converge similarly on the sides, as shown by dotted lines in Fig. 2, by means of plates extending at an inclination from the flue-sheet to the mouth of the hood, so that the smoke passage or space below the hood is thus of hopper shape, with all four sides inclining and converging toward the mouth of the hood. Hence the draft from the flues will be concentrated evenly toward the mouth of the hood, and the sparks carried by the draft will be guided along the smooth inclined sides of the deflector, and, striking the downwardly-curved face of the hood, will be thence projected straight down into the water in the extinguishing-box $h$, where they will be immediately extinguished, and thence sink to and collect in the bottom of the tank, as illustrated in Fig. 1.

The area at the contracted end of the deflector or mouth of the hood should be equal to the combined area of the boiler-tubes, and the ascending space between the deflector and the front of the smoke-box should be of equal or greater area, so that hence the draft is not obstructed at all by the deflector, but merely changed in its direction when it is projected into the water-box, and it will be noted on reference to Fig. 1 that in our present invention the water-level in this extinguishing-box is placed at a considerable distance below the mouth of the hood, and that the mouth of the hood terminates over about the middle of the water-box. This arrangement not only renders the draft free, but insures the arrest and extinguishment of all the sparks in the water, for while the hood discharges straight down or at a slight forward inclination into the water, the sparks, by their own momentum and their reflection from the inclined surface of the deflector, are projected forcibly into the water, while the large free space between the deflector and the water allows the draft to gradually change in its direction and to suddenly decrease in its speed relatively to the speed of the sparks, which, as may be readily appreciated, will effectually prevent any sparks or cinders being carried off with the ascending stream of draft, as would occur if the deflector discharged close to the water, as more commonly arranged heretofore. We have hence found that the spark-arresting function of this construction is very effective, and nothing but clear gases or smoke devoid of sparks or cinders are discharged from the stack.

It may be also noted by reference to Fig. 1 that the space in the smoke-box above the deflector is considerably larger than the space below the deflector, and that the exhaust-nozzles $g$ discharge into this space just above the deflector and directly under the stack, and at some distance from the mouth of the deflector. Hence the emission of the exhaust-jets has a powerful eductive effect in withdrawing the contents of this upper space rapidly in large volumes and ejecting the same from the stack, thereby producing a free and powerful draft through the tubes and deflector to supply the effective vacuum thus created in the upper space of the smoke-box, and this arrangement, in connection with the depressed water-tank, we find to be very effective in producing a free and strong draft without carrying out any sparks, so that not only is the discharge of the engine rendered clear, but its steaming qualities are found to be materially improved.

By reference to Figs. 1 and 3 it will be noted that the hood is provided with an adjustable pendent lip or edge, $m$, in the form of a flat plate perforated with slots, through which clamp-screws pass, by means of which the lip may be set to project more or less from the edge of the hood, as will be readily understood. When the hood is adjusted to its proper position this lip $m$ should be so adjusted that its lower edge will always be either on a level with the top of the wall $h'$ or somewhat below the same, so that any sparks moving along the base of the smoke-box will be sure to be intercepted and deflected down into the water by the pendent lip.

According to our present invention, the surface of the water in the extinguishing-chamber is not obstructed by any splash-preventing guards, screens, or partitions heretofore used.

In the Groesbeck application before mentioned the water-box was divided into a series of cells by crossed partitions extending down into and above the water, which is a desirable feature in some engines and with some kinds of coal; but for more general uses we find it much more desirable to leave the mass of the water free and its surface entirely unobstructed, as we find that this renders the draft more free and catches the sparks very effectively. We find, however, that some means is necessary to limit the surge of the water in the box and prevent its being whirled or sucked up and ejected from the stack by the effect of the exhaust-jet and by the powerful draft which sweeps through the smoke-box.

In the practical action of locomotives we find that the tendency of the water is to surge up each side of the box, caused by the rocking motion of the engine, and that the tendency of the uprising draft is to travel close up the sides of the box, and thus catch the surging water and eject it from the stack, and without some preventive the contents of the water-box would be rapidly ejected from the top of the stack, and the box soon emptied in this way. Now, according to our present improvement, we affix on each side of the water-box, and at some distance above the water-level, the overhanging guards or hoods $u\ u$, which effectually arrest the surging of the water up the sides of the box and cut off the draft from the sides, as will be readily understood, while the whole mass and surface of the water is left free and unobstructed to catch the sparks.

The water-guards $u\ u$ are preferably made of wrought-iron plates, like the rest of the fittings, and suitably affixed by bolts and angle-irons to the sides of the water-box, and these plates are preferably bent at right angles, as shown, with the pendent sides longer than the horizontal sides; but this special shape is not essential, for any other form of overhanging plate or guard may be used. The guards preferably extend out sufficiently far from the sides of the water-box so as to closely approach the ends of the hood $r$, which thus fits closely between said guards, so that the draft and sparks are projected into the water-box directly down between the guards, and the guards thus prevent the possibility of any sparks escaping laterally and compel them to pass directly down into the water, while the strong current thus passing down the pendent sides of the guard prevents the splashing up of any water that may surge under the guards.

In our present improvement the bottom or mouth of the water-box terminates on an inclined plane, which is lowest on the front end, and is provided with an inclined door or lid, $v$, hinged at its back edge so as to swing downward and backward when it is desired to dump the contents of the box, which we find to be a very convenient and efficient arrangement. This dumping-door is preferably made of cast-iron of substantial thickness, and around its margin dovetailed grooves are planed, as shown well in Figs. 1 and 4, in which thick strips of rubber, $v'$, are firmly socketed, as illustrated, against which the edges of the iron box seat when the door is closed, as seen in Figs. 1 and 3 and in the fragmentary view in Fig. 4, thus forming a firm watertight joint in a simple and efficient manner. We prefer to bevel the iron edges of the box to a right-angled edge, as seen best in Fig. 4, which will embed itself readily in the rubber and prevent the possibility of any cinders lodging between the two when the door is closed, for such cinders would either be forced out of the way by the beveled edge or cut in two, thus insuring under all circumstances a uniform contact or embedment of the edge of the box in the rubber, and thus rendering the joint perfectly water-tight. This door is not hinged directly to the water-box, but it is pivoted on a central longitudinal axis to the two hinging arms or levers $v'''$, which extend between transverse ribs cast on the under side of the door, as seen in Figs. 1 and 4, and are engaged therewith by the pivot-pins $v''$. The back end of these levers is bent at right angles to project past the edge of the door and engage with hinging-lugs $v''''$, affixed to the back wall, $h'$, of the water-box, whereby the levers and their pivoted door are thus hinged to the back edge of the box.

The operating device for opening and closing the dumping-door connects to the hinging-levers $v'''$, as seen best in Fig. 1; and it will therefore be seen that when the lid is closed and forced to its seat the pivotal connection of the lid with the hinging-levers will allow the lid to center itself upon the seat and adapt its packing-face to the exact plane of the mouth of the water-box, thus insuring an even, close contact all around the edge of the same, which will render a water-tight joint certain. On the other hand, it may be noted that when the lid is opened to dump the accumulated cinders and dirty water the lid will swing backwardly on a downward incline, as shown by dotted lines in Fig. 1, and will thus discharge the contents quickly and easily and spread the cinders evenly on the track, between the rails.

The operating device for opening and closing the dumping-door in our present invention is not actuated by manual power, as heretofore, but is operated by steam-power in a much more energetic and certain manner under the control of a steam-valve from the cab. Thus, referring to Figs. 1 and 4, it will be seen that the hinging-levers $v'''$ on the dumping-door are coupled by connecting-rods $w$ with pendent levers $w'$, projecting from and fixed to a rock-shaft, $w''$, which is journaled in bearings on the frame-bars $f$ at a point a little forward of the rear axle of the truck; that a third lever-arm, $w'''$, projects upwardly from this rock-shaft, and is engaged by the rod of a piston which works in a small steam-cylinder, $w''''$, affixed to and projecting backwardly from the saddles $c$ of the engine, as well shown in Figs. 1 and 4. This steam-cylinder, which is shown in enlarged section in Fig. 5, is connected at each end by pipes with a steam-chest, $y$. (Shown in enlarged section in Fig. 6 and by dotted lines in Fig. 1.) This steam-chest is mounted on the side rail or running-board of the engine, (see Figs. 1 and 6,) and is provided with an ordinary form of D slide-valve and an ordinary ported seat, the steam-ports of which connect with the steam-pipes going to each end of the cylinder, while the exhaust-port connects to an exhaust-pipe, $y'$, which runs into the smoke-arch and discharges up between the exhaust-nozzles, as seen in Figs. 1 and 2. The valve-stem 12 of this slide-valve extends back to the cab, (see Figs. 8 and 9,) and is there terminated with or connected to a suitable manipulating device, 13, whereby it may be readily moved back or forth or held in fixed position, as required. The steam-pipe $y''$, admitting the steam to the steam-chest, also extends back to the cab, and from thence connects to the boiler, the pipe being provided with a valve in the cab, whereby it may be opened or closed to shut off or let on the steam, as desired. Now, when the engine is in action the valve in the steam-pipe $y''$ is of course opened, permitting the steam to flow into the steam-chest, and the slide-valve is set, as seen in Figs. 6 and 5, so as to admit the steam to the front side of the piston, thus pressing it forcibly backward, and thereby keeping the dumping-door, to which the piston is operatively connected, tightly closed, and in a much more effective manner than could be accomplished by any catch or fastening, as the pressure of the steam is exerted constantly upon the door to hold it with positive firmness to its seat. It will be seen, however, that when it is desired to open or dump the door it is only necessary to shift the slide-valve, when the action of the steam on the piston will be reversed and the door instantly swung open, as indicated by dotted lines in Fig. 1, thus dumping the contents of the tank, and thereby accomplishing a laborious action in a very quick and certain manner, without requiring any exertion on the part of the engineer.

One of the connecting-rods $w$ for operating the door is adjustable by means of a turn-buckle, as seen in Fig. 1, whereby the pressure may be exerted evenly on each end of the door.

According to another feature of our improvement, we so devise the construction that the dumping or opening motion of the dumping-door will operate a poking or raking device in the water-box, so as to break up and withdraw any compacted or coked mass of cinders which may form in the water-box. This we effect by affixing to the upper side of the dumping-door, near its front edge, a curved bar or horn, $x$, (see Figs. 1 and 3,) which projects upwardly within the water-box, and is jointed to a vertical poking or raking bar, $x'$, which is free to slide at its upper end through a fixed guiding-arm, $x''$, projecting from the front of the smoke-box, and from this poking-bar $x'$ two horizontal raking-arms, $x'''$, extend laterally just at or below the water-line, as fully shown in Figs. 1, 3, 2, and 4. It will therefore be readily seen that when the dumping-door is swung open this raking device will sweep forcibly down through the middle of the water-box, and thus break up any coked or conglomerated masses of cinders, and thereby insure their discharge with the spent water from the box, for we find that with certain kinds of soft coal the extinguished sparks or cinders are very liable to compact into a firm mass in the water-box, and we therefore find that the raking device forms a most desirable feature to render the dumping of the accumulated contents of the water-box certain under all circumstances. As soon as the contents of the extinguishing-box are discharged, as just described, a fresh charge of water is forced into the box, which is admitted just before the door is closed, so as to wash off the sides of the box, and is continued after the door is closed until the box is filled to the proper level, as will be understood. This water is admitted through the pipe 3, (see Figs. 1, 2, and 3,) which is connected at its rear end with the water-supply tanks in the tender, thence passes forwardly along the frame of the engine and extends into the extinguishing-box, just over the saddles $c$ and below the curved shell of the smoke-arch, (see Figs. 3 and 1,) and is continued around three sides of the box, as seen best in Fig. 2, passing under the guards $u$ $u$ on the opposite sides of the box and across the front end, as seen also in Figs. 1 and 3. The terminal end of the pipe within the box is closed; but from its under side a series of jet-pipes, 4, depend at intervals, and discharge below the water-line of the tank and close to the sides of the same, as seen best in Figs. 1 and 3. Hence when the water is admitted it will be discharged in a series of jets around and down the sides of the box, thus washing off the same while the dumping-door is open, preparatory to filling the box as soon as the door is closed, as will be understood. The water may be allowed to flow into the box simply by gravity from the tanks in the tender; but when an energetic discharge of the water in the box is desired a steam jet or injector may be used to impel it, as shown in Fig. 8. The water-pipe 3 may also be connected with the boiler below its water-line, under the control of a suitable valve, so that in winter weather hot water may be forced into the extinguishing-box to thaw out any ice that may form therein.

In order to enable the engineer in the cab to ascertain at any time the height of water or depth of cinders in the extinguishing-box, so as to enable him to readily know when to dump the contents and renew the charge of water, a float, 5, is provided, and is operatively connected with a manipulating device which extends to the cab, so that the advanced or receded position of the manipulating device in the cab by the rise or fall of the float will at once indicate the height of water, while if the manipulating device be seized and moved so as to depress the float in the water until it is resisted by contact with the cinders (see Fig. 1) the amount of cinders will be readily shown by the space through which the device has been moved, thus providing a ready means whereby the engineer can always know when to renew the charge of water or dump the contents, as will be readily understood, and which is a very important feature in spark-arresters of this class.

The float 5, as shown by an enlarged detail in Fig. 7, is preferably made of a strong hollow cylinder of sheet-iron, brazed at the joints, so that it can safely withstand the rain of sparks upon it when within the extinguishing-box without injury. It may also be seen that the float-cylinder is made with a tube extending through its center, which is slipped onto the turned part of the lever-arm 6, and there fastened by nuts, as shown, so that the cylinder can thus be readily removed or attached, as may be necessary. The pivotal arm or floating lever 6 is clamped to the pivotal or rock shaft 7, journaled at one end in the extinguishing-box above the water-level, as shown in Figs. 1 and 2, and projecting at the other end through the side of the box, and there provided with a crank-arm, which is connected by means of the rod 8 and elbow-lever 8' with the manipulating-rod 9, which extends to the cab through one of the hand-rails, as fully shown by full and dotted lines in Figs. 3, 2, and 1, also in Figs. 8 and 9. A stop arm, 6', projects at right angles from the float-lever 6 to contact with the side of the water-box when the float is depressed to its lowest point, so as to prevent the striking of the float-cylinder against the side of the box, as indicated by dotted lines in Fig. 1.

It will be seen that the float not only acts as a buoy to indicate by its quiescent position the level of the water, but it also acts as a feeler or sounder, when it is forcibly depressed, to show the level of the cinders, and for this latter function it is not necessary that the device be a float, but simply a movable bar so pivoted or mounted as to be free to move up or down in the water-box, with a spring tending constantly to hold it at the water-level; but the float is of course preferable, as it serves both purposes.

It may be observed by reference to Figs. 1 and 3 that the water-level in the extinguishing-box is placed at a good distance below the level of the lowest of the boiler-tubes, and that the rear wall, $h'$, of the water-box rises well above the water-level and above the lowest tubes, forming an efficient dam to prevent the probability of any water splashing over the same into the tubes, and thus causing sudden puffs or explosions in the smoke-arch by the contact of the water with the highly-heated flues. In order to prevent the rise of the water beyond its normal level or its overflow of the dam into the boiler-tubes in case the water-supply should be continued too long, an overflow outlet or tube, $z$, (see Fig. 3,) projects from the side of the water-box a little above the normal water-level, and this tube terminates with an inclined mouth, over which is placed a freely-swinging hinged cover, $z'$, whose natural gravitation will close the outlet against pressure from without, but forms a free outwardly-opening valve which readily yields and opens to pressure from within. It will therefore be seen that should the water-level rise inadvertently beyond the normal line the excess will readily escape through this overflow-valve, and thus prevent the possibility of the water-level rising beyond this valve. Instead of this valve, however, a siphon-pipe might be used in the same position and with the same effect.

At $q$, Fig. 1, is shown a register on the side and front end of the smoke-arch, the opening and closing of which are controlled from the cab, forming an air-inlet, whereby atmospheric air may be admitted to the smoke-arch to supply or partly supply the eductive action of the exhaust-jets, and thus proportionately reduce the draft through the boiler-tubes, whereby the draft on the furnace may be regulated and a more perfect and economical combustion obtained; but as this device is the sole invention of David Groesbeck, and will be made the subject of a separate application, no further reference to the device will be here necessary.

Having thus described the construction and operation of our invention, it may therefore be now observed that it embodies a number of novel features adapted to meet the several conditions and to fulfill the several requirements which we have found to exist in the practical action of locomotives, and which do not seem to have been heretofore either appreciated or satisfied.

We thus provide a very efficient spark-arrester, which is not only reliable in extinguishing and arresting all the sparks, but also in the performance of the various sub-functions of dumping, recharging with water, indicating the conditions in the extinguishing-box, and preventing morbid conditions therein; and we find, further, that a locomotive thus equipped actually has its draft improved and its steaming qualities and driving-power appreciably increased, for all the screens or obstructions heretofore used in smoke arch or funnel are dispensed with.

We thus present an important improvement in this class of inventions, to which much attention has been heretofore given, and by efficiently arresting the sparks we not only prevent the occurrence of fires from that cause along the line of the railways, but we also prevent the fall of cinders and other matter from the stack about or into the train, which has been a serious annoyance to passengers in railway traveling, and by the same means we also greatly reduce the discharge of foul-smelling gases, which are chiefly produced by the contact of exhaust-steam on the sparks or incandescent cinders, but which does not occur in our case.

Instead of operating the dumping mechanism by steam from the boiler, it may be operated by compresed air from the air-brake apparatus, if desired.

What we claim is as follows:

1. The combination, with the smoke-box of a locomotive-boiler, of the spark-deflecting partition *p*, extending out from the flue-sheet over the flues and over the floor of the smoke-box, with the water-tank *h* depending below the floor of the smoke-box in front of said partition, and the downwardly-turned hood or end *r* of said partition, discharging over the water of said tank and made adjustable vertically to or from the water-level, substantially as and for the purpose set forth.

2. The combination, with the smoke-box of a locomotive-boiler and with a vertically-adjustable spark deflector or conductor therein, of the screw-rod *s'*, connecting to said partition and extending through the smoke-box, with its external adjusting-nut, *s''*, substantially as and for the purpose set forth.

3. The combination, with the smoke-box of a locomotive-boiler and with a water-chamber in its front portion, of a converging spark-conductor, converging or inclining on all sides, extending out from the tube-sheet over the tubes, and discharging downwardly at its narrow or converging end into said water-chamber, its discharging end or mouth having an area equal to the combined area of the tubes, or nearly so, and placed at a distance above the water-level equal to the said area, and at a similar distance from the front end of the smoke-box, substantially as and for the purpose set forth.

4. The combination, with the smoke-box in a locomotive-boiler, of a pendent or depressed water-tank in the front portion thereof, and a spark deflector or conductor discharging into the same from the flues, with a dam at or near the wall of said tank rising above the base of the smoke-arch and above the lower flues, substantially as herein shown and described.

5. The combination, in a spark-arrester, with a spark-extinguishing chamber or water-box and a spark conductor or deflector discharging into the same, of overhanging splash-guards projecting from the sides of the water-box above the water-level, substantially as and for the purpose set forth.

6. The combination, in a spark-arrester, with a water-box or extinguishing-chamber and a spark-conductor discharging into the same, of overhanging splash-guards projecting from the sides of the water-box above the water, and with the mouth of the spark-conductor discharging directly down between said guards, substantially as herein shown and described.

7. The combination, in a spark-arrester for locomotive-boilers, of an extinguishing-chamber or water-box depending from the front of the smoke-arch, and provided at its base with a discharging-mouth and a movable dumping-door arranged to cover or uncover the same, and hinged at or near the back edge of the mouth, and arranged to swing downwardly and backwardly therefrom, with a motive device for operating the same, substantially as herein set forth.

8. The combination, in a spark-arrester substantially such as set forth, with a water-chamber provided with a discharging-orifice at its base and a movable dumping-door arranged to cover and uncover the same, and pivotally connected at or near its middle to its hinging or operating supports, substantially as herein shown and described.

9. The combination, in a spark-arrester, with an extinguishing-chamber or water-box open at the base and terminating with narrow edges, of a dumping-door arranged to cover and uncover said open base, and provided with elastic margins to seat directly against the narrow edges of said open base, substantially as and for the purpose set forth.

10. The combination, in a spark-arrester, of an extinguishing-chamber or water-box open at the base, and a movable dumping-door arranged to cover and uncover said base, with the perimeter or margins of said open base beveled to a cutting-edge to seat against the face of the dumping-door, substantially as and for the purpose set forth.

11. The combination, in a spark-arrester, with a spark receiving and extinguishing water-box having a dumping-door at the base, of a water-supply pipe extending into said box around the sides thereof, and provided with a series of jets discharging downwardly around the sides of the box, substantially as and for the purpose set forth.

12. The combination, with a locomotive engine or boiler, of a spark-arrester provided with a spark-extinguishing water-box having a dumping-door at the base, a steam-motor operatively connected with said door, and valves and connections controlling a supply of steam from the boiler to said motor, whereby the said dumping-door may be opened or closed by manipulating the steam-valve of said motor, substantially as herein set forth.

13. The combination, with a locomotive boiler or engine, of a spark-arrester provided with an extinguishing water-chamber having a dumping-door at the base, a cylinder having a movable piston operatively connected with said dumping-door, and connections from each end of said cylinder to a supply of motive fluid and a valve for controlling the flow of the same, whereby the manipulation of said valve will admit the pressure of the motive fluid on either side of said piston, and thus forcibly close or open the dumping-door, substantially as herein set forth.

14. The combination, in a locomotive-engine, with a spark-arrester on the front end, provided with a spark-extinguishing water-box, of a movable arm or sounder, movable from the water-line down in the water of the box, with a manipulating device extending therefrom to the cab, substantially as and for the purpose set forth.

15. The combination, in a locomotive-engine, with a spark-extinguishing water-chamber, of a float movable up or down in said water-chamber and a manipulating device extending therefrom to the cab, substantially as and for the purpose set forth.

16. The combination, in a spark-arrester, with a spark-receiving water-chamber and a dumping-door at the base of the same, of a raking or poking device attached to said door and rising through the water-box, whereby the dumping motion of the door will move said raking device and break up and discharge compacted coals or cinders, substantially as herein set forth.

17. In a spark-arrester, the combination, with a spark-extinguishing water-box and means to recharge the same with water, of an overflow-valve opening from the interior of the box at or somewhat above its normal water-line, and arranged to yield and open freely to pressure from within, but to close to pressure from without, whereby the outflow of excessive water is permitted, but inflow of air prevented, substantially as and for the purpose set forth.

DAVID GROESBECK.
JOSEPH A. STERLING.
CHAS. A. BALL.
D. PRATT WRIGHT.

Witnesses for Groesbeck, Sterling, and Ball:
ROBERT JACKSON,
CHAS. M. HIGGINS.

Witnesses for Wright:
HENRY R. ELLIS,
HERBERT HUTCHINSON.